United States Patent
Bos

[15] 3,692,987
[45] Sept. 19, 1972

[54] METHODS AND APPARATUS FOR ALLOCATING THE MEASURED NOISE AND RESISTANCE OF A THIN-FILM RESISTOR BETWEEN THE RESISTOR PROPER AND THE CONTACT PADS THEREFOR

[72] Inventor: Laurence William Bos, West Windsor Township, Mercer County, N.J.

[73] Assignee: Western Electric Company, Incorporated, New York, N.Y.

[22] Filed: July 6, 1970

[21] Appl. No.: 52,568

[52] U.S. Cl. ............. 235/151.31, 29/593, 324/57 N, 324/73 AT, 338/320
[51] Int. Cl. ................. G06f 15/20, G01r 27/00
[58] Field of Search ..235/151.3, 151.31; 324/73 AT, 324/57 N; 328/62, 63, 64; 338/308, 320; 29/593

[56] References Cited

UNITED STATES PATENTS

| | | |
|---|---|---|
| 3,235,802 | 2/1966 | Biard et al. .............. 324/73 X |
| 3,219,927 | 11/1965 | Topp et al. .................. 324/73 |
| 3,458,807 | 7/1969 | Smith ......................... 324/73 |
| 2,911,146 | 11/1959 | Lanneau et al. ............ 235/180 |
| 2,924,384 | 2/1960 | Porter ....................... 235/180 |
| 3,496,461 | 2/1970 | Sessler et al. ............... 324/62 |

OTHER PUBLICATIONS

Hewlett–Packard Journal Aug. 1969, Vol. 20, No. 12: See page 7–11 and 2–6. Automated testing.

Primary Examiner—Felix D. Gruber
Attorney—W. M. Kain, R. P. Miller and R. C. Winter

[57] ABSTRACT

Three similar thin-film devices are fabricated in proximate relation on an insulating substrate. Each resistor has conductive contact pads fabricated thereon. The three devices may have different electrical resistances, but congruent areas underlying the contact pads are maintained for all three devices. Noise measurements and computer calculations on all three devices permit allocation of these parameters between the thin-film proper and the interfaces between the thin films and the conductive contact pads.

9 Claims, 4 Drawing Figures

PATENTED SEP 19 1972     3,692,987

INVENTOR
L. W. BOS
By Bryan W. Sheffield
ATTORNEY

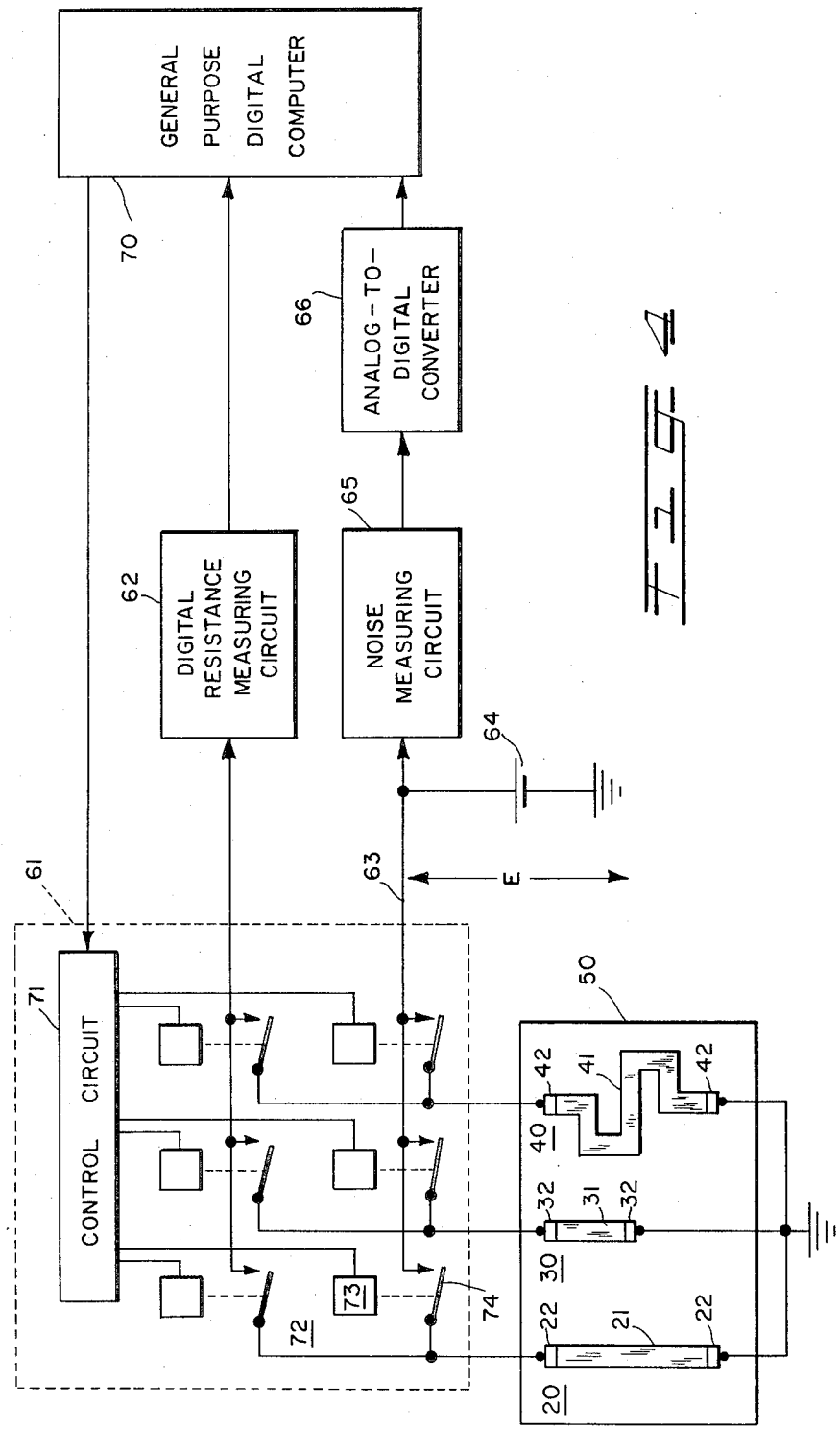

METHODS AND APPARATUS FOR ALLOCATING THE MEASURED NOISE AND RESISTANCE OF A THIN-FILM RESISTOR BETWEEN THE RESISTOR PROPER AND THE CONTACT PADS THEREFOR

BACKGROUND OF THE INVENTION

Broadly speaking, this invention relates to the measurement of noise and resistance in thin-film devices, and the like. More specifically, in a preferred embodiment, this invention relates to methods and apparatus for allocating the measured noise and resistance of a thin-film device between the thin-film proper and the interface between the film and conductive contact pads which are overlaid on the film for the purpose of connecting the thin-film device to external circuitry.

With the current trend towards the miniaturization of electronic equipment, the use of thin-film devices, such as thin-film resistors and thin-film capacitors, is becoming increasingly widespread. Thin-film resistors, for example, typically comprise a thin layer of a conductive film, such as tantalum nitride, which has been sputtered onto an insulating substrate, such as ceramic. To interconnect such a device with other components, conductive, e.g., gold, contact pads are overlaid, for example, by evaporation, onto the conductive film at appropriate locations thereon.

Thin-film devices, like other electrical components, inherently generate electrical noise when a current passes therethrough. While the mechanism underlying this phenomenon is understood for conventional components, it is not fully understood for thin-film devices. Part of the noise which is observed in such thin-film devices is believed to originate in the thin film itself. The remainder is believed to originate in the interface between the thin film and the conductive pads overlaid thereon to interconnect the device to the outside world. More specifically, this latter noise is further believed to originate in oxide layer which forms between the tantalum nitride film and the gold contact pads. The physical roughness of the interface and chemiosorbed or physiosorbed impurities sandwiched between the oxide layer and the contact pad material are also believed to contribute to this noise.

Ordinarily, there is no requirement to pin-point the exact location where the observed noise in a thin-film device is originating. If the overall noise figure of the device is less than some predetermined maximum permissible noise level, the device may be safely used for its intended purpose. On occasion, however, it may be important to determine exactly where the noise is coming from. For example, in a manufacturing process, if a statistically significant number of devices consistently exceed the maximum permissible noise figure, it is important to known whether it is the tantalum nitride sputtering process used for the deposition of terminals on the resistors, or the gold evaporation process that is defective, in order that appropriate corrective measures may be taken in regard to these processes.

Unfortunately, prior to this invention, it was not possible to make this determination accurately. Thus, typically, when unacceptable devices were observed, it was heretofore necessary to carefully check both the sputtering and the evaporation processes for abnormal operating conditions.

The above problem has now been solved by the instant invention which in one embodiment comprises a method of determining the noise generated across both the thin-film portion and the thin film-contact pad interfaces of a thin-film device. In this fashion it is possible to determine which of a plurality of processing steps utilized in the manufacture of the device is responsible for excessive noise observed therein. The method comprises the steps of: fabricating at least three thin-film resistors in proximate relation on an insulating substrate; depositing a pair of conductive contact pads on each of said three resistors, the area of the interface between said contact pads and said thin-film resistors being the same for all three of said resistors; and, under the control of a digital computer, measuring the resistance of said devices, measuring the noise voltage developed across each of said resistors upon the application of a test potential thereto; and solving in the computer three simultaneous equations with three unknown quantities, utilizing the results of said resistance-measuring step and said noise-measuring step as a factor in said simultaneous equations, whereby the noise parameters of said thin-film portion and said thin-film contact pad interfaces are obtained.

DESCRIPTION OF THE DRAWINGS

FIG. 4 is a schematic representation of an apparatus which may be used, in conjunction with the thin-film configuration shown in FIG. 3, to obtain the above-mentioned noise and resistance parameters.

DETAILED DESCRIPTION OF THE INVENTION

Figure 1:
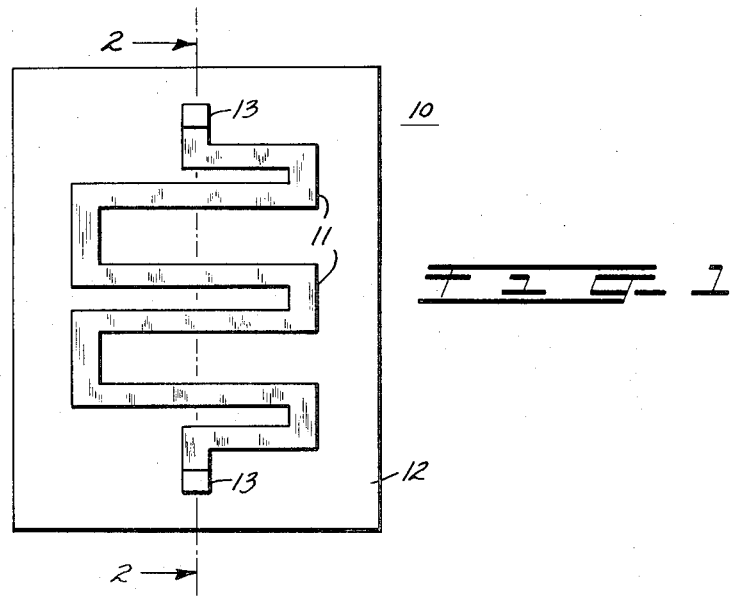
FIG. 1 is a plan view of a typical thin-film device, specifically a sputtered, tantalum-nitride, thin-film resistor.

FIG. 1 illustrates a typical thin-film device, specifically a thin-film resistor. As shown, thin-film resistor 10 comprises a thin, conductive film 11, such as tantalum nitride ($Ta_2N$), which has been deposited by sputtering, or otherwise, in a particular pattern upon an insulating substrate 12, such as glass or alumina. A pair of conductive contact pads 13-13 are laid down over the extreme ends of the thin-film pattern to interconnect the resistor to external circuitry. Typically, pads 13-13 comprise a thin layer of metallic gold which has been deposited onto film 11 by an evaporation process.

Figure 2:
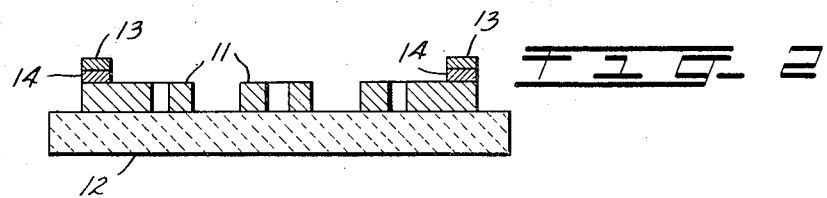
FIG. 2 is a cross section taken about line 2—2 of the thin-film resistor shown in FIG. 1.

FIG. 2 shows the layer of oxide 14 and/or other impurities inevitably present between the upper surface of thin film 11 and the lower surface of each of the contact pads 13. In FIG. 2, the dimensions of oxide layer 14 are exaggerated for the purpose of clarity. Although not shown in FIG. 2, there may, in addition, be chemiosorbed or physiosorbed impurities present between the oxide layer 14 and the lower surface of contact pads 13. For example, where pads 13 comprise nickel (Ni) which has been electrolessly deposited on a thin film of $Ta_2N$, these impurities might comprise palladium (Pd) atoms deposited on the oxide layer.

Any current which passes through resistor 10 must, of necessity, pass through oxide layers 14 and the other impurities in addition to passing through the thin-film proper. Thus, the overall resistance and noise figure of resistor 10 will have contributions from both thin film 11 and the interfaces between pads 13 and thin film 11. Direct access to the pad-film interface is, of course, not possible, and only the overall noise and the overall resistance of the device may be measured. In accordance with this invention, however, these overall measurements are used to obtain the noise and resistance contributed by the thin-film proper and by the thin film-pad interfaces.

As is well known, the resistance of a thin-film resistor is directly proportional to the resistivity, $\rho$, and inversely proportional to the thickness, $d$. It is, therefore, convenient to define a quantity $R_s$ which is equal to $\rho/d$. The quantity, $R_s$, is called the sheet resistance and may be thought of as a material property since the film is essentially two dimensional. A thin-film resistor consisting of a simple rectangle of length $l$ (in the direction of the current) and width $w$ has a resistance of $$R = (\rho/d)(l/w) \quad (1)$$
$$= R_s(l/w) \quad (2)$$

The ratio $l/w$ is sometimes called the number of squares in the resistor, since it is equal to the number of squares of side $w$ that can be superimposed on the resistor without overlapping. The term "squares" is a pure number, having no dimensions. The sheet resistance, $R_s$, has the units of ohms, but it is convenient to refer to it in ohms per square since the sheet resistance produces the resistance of the resistor when multiplied by the number of squares. The concept can then be broadened to include any arbitrarily shaped resistor by calling the quantity $Rd/\rho$ the effective number of squares.

Figure 3:
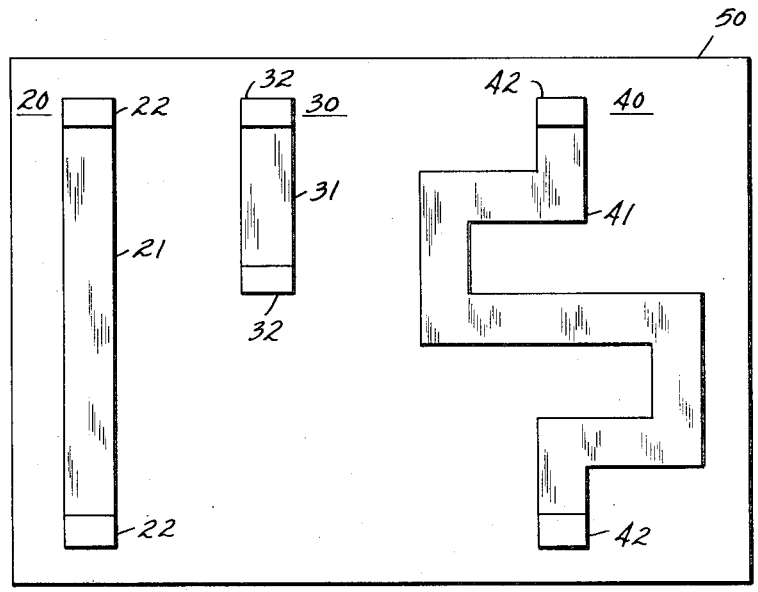
FIG. 3 is a plan view of a configuration of three such thin-film devices which may be used, in accordance with this invention, to obtain the noise and resistance parameters of the thin-film proper and the thin film-contact pad interface of the device shown in FIG. 1.

FIG. 3 illustrates a special configuration of three thin-film resistors which may be used, in accordance with this invention, to obtain the noise and resistance contribution of both the thin-film proper and the thin film-contact pad interface. As shown, thin-film resistor 20, 30, and 40 are deposited by sputtering, or otherwise, on insulating substrate 50. Resistor 20, for example, comprises a pattern of thin-film material 21 and a pair of conductive contact pads 22-22 located at either end of film pattern 21. Similarly, resistors 30 and 40 comprise patterns of thin film 31 and 41, respectively, having conductive contact pads 32-32 and 42-42, overlaid thereon respectively.

Resistors 20, 30, and 40 are advantageously sputtered onto substrate 50 at the same time and in the same general area of the substrate. This will ensure that the three resistors exhibit essentially identical electrical and physical properties. It will be appreciated, however, that resistors 20, 30, and 40 could be formed upon a portion of some larger thin-film circuit or, indeed, could actually comprise components of an operating thin-film circuit. For that matter, resistors 20, 30, and 40 need not be formed on the same substrate at the same time, but could comprise three separate and distinct resistors. In this event, however, care would be necessary to ensure that all three resistors exhibited essentially similar electrical and mechanical properties. Since this need not be done when all three resistors are simultaneously fabricated on the same substrate, this latter is a preferred embodiment. Typical resistance values for the resistors 20, 30, and 40 are 100 ohms, 500 ohms, and 5,000 ohms, respectively.

In the configuration shown in FIG. 3, resistors 20, 30, and 40 each possess a different number of "squares" and hence the thin-film portions thereof, 21, 31, and 41 have different electrical resistances, $R_1$, $R_2$, and $R_3$, respectively. In the preferred embodiment, the path width of the resistors is assumed equal. Because the physical and electrical characteristics of the resistors are similar, the assumption will be made that the specific resistivity, $\rho$, in ohm-cm of thin films 21, 31, and 41, is the same, thus $\rho_1 = \rho_2 = \rho_3$. Additionally, it will be assumed that the noise generated in the thin-film portions 21, 31, and 41 of resistors 20, 30, and 40, respectively, can be expressed in terms of the quantity $Y$ in $\mu v/volt$ where $Y$ is the noise figure for any one of the resistors, but which in what follows will be assumed to be the resistor $R_1$.

To determine the noise figures for other resistors having the same path width $w$ but a different number of squares, assume that a test potential ($E_t$) is applied across a resistor $R$ which has 1 square. The length and width of the resistive element are $w$, the width of the resistors in the preferred embodiment. The resulting r.m.s. noise power is assumed to be $\overline{E_n^2}$, and the noise figure in $\mu v/volt$ is given by $$\sqrt{\overline{N^2}} = \sqrt{(\overline{E_n^2}/E_t)} \quad (3)$$

where $\overline{E_n^2}$ is taken to mean the ensemble average of the square of the noise voltage. It is next necessary to see how the noise figures of the resistors proper are related to each other. First consider $R_1$ with $n_1$ squares. If a d.c. potential of $n_1 E_t$ is applied, the current through $R_1$ and the d.c. potential across each 1 square segment will be the same as in the test case given above. Since noise voltages are uncorrelated, the noise powers add, and the total mean squared noise voltage across $R_1$ is given by, in (microvolts)$^2$ $$\overline{E_{n_1}^2} = n_1 \overline{E_n^2} \quad (4)$$

and the noise figure in $\mu v/volt$ is $$\sqrt{\overline{N_1^2}} = \frac{\sqrt{n_1 \overline{E_n^2}}}{n_1 E_t} = \frac{1}{\sqrt{n_1}} \frac{\sqrt{\overline{E_n^2}}}{E_t} = \frac{\sqrt{\overline{N^2}}}{\sqrt{n_1}} = Y \quad (5)$$

Similarly, the noise figure for $R_2$ with $n_2$ squares is $$\sqrt{\overline{N_2^2}} = \frac{\sqrt{\overline{N^2}}}{\sqrt{n_2}} = \sqrt{\frac{n_1}{n_2}} Y = \sqrt{\frac{R_1}{R_2}} Y \quad (6)$$

and that of $R_3$ with $n_3$ squares is $$\sqrt{\overline{N_3^2}} = \sqrt{\frac{R_1}{R_3}} Y \quad (7)$$

It will be noted that even though the sizes of the thin films 21, 31, and 41, are different, the areas and shapes of the contact pad-thin film interfaces 22, 32, and 42 are identical for all three resistors. In other words, the area of the film 21 underlying each contact pad 22 must equal the area of thin film 31 underlying each contact pad 32, and so on, and, in addition, the corresponding dimensions of the contact pads must be identical.

This latter requirement is necessary to ensure that the interface resistances $r$ in ohms and the noise generating abilities of the interfaces X in $\mu v/volt$ are the same for all three resistors. The current density across the interface is greatest along the edge nearest the resistor film. It can be shown that if this edge is doubled in length, keeping the other dimension the same, the noise figure of the interface will be reduced by a factor of $\sqrt{2}$.

It will be appreciated that many other combinations of resistor and contact pad geometry exist which could be analyzed in a manner similar to that given above.

Assume now that a potential source of E volts is connected between the contact pads of resistor 20, causing a current I to flow through the thin-film proper and the two associated thin film-contact pad interfaces of resistor 20.

$$Now, \quad E = IR \tag{8}$$

$$where \quad R_{total} = R_1 + 2r \tag{9}$$

and where $r$ is the resistance of each interface (10)

$$Thus, \quad E = I(R_1 + 2r) \tag{11}$$

$$or \quad I = E/(R_1 + 2r) \tag{12}$$

Thus the voltage drop across each thin film-contact pad interface, $Vi_1$, is given by $$Vi_1 = Ir \tag{13}$$

$$= \frac{rE}{(R_1+2r)} \tag{14}$$

Similarly, the voltage drop across the other interfaces, $Vi_2$ and $Vi_3$, will be given by $$Vi_2 = \frac{rE}{(R_2+2r)} \tag{15}$$

$$Vi_3 = \frac{rE}{(R_3+2r)} \tag{16}$$

Further, the voltage drop across the thin film 21 in resistor 20, $V_{R_1}$, will be given by $$V_{R_1} = IR_1 \tag{17}$$

$$V_{R_1} = \frac{R_1 E}{(R_1+2r)} \tag{18}$$

Similarly, the voltage drop across thin films 31 and 41 in resistors 30 and 40, respectively, will be given by $$V_{R_2} = \frac{R_2 E}{(R_2+2r)} \tag{19}$$

and $$V_{R_3} = \frac{R_3 E}{(R_3+2r)} \tag{20}$$

Now, the r.m.s. noise generated at a given interface, $e_i$, will be given by $$e_{i_1} = Vi_1 X \tag{21}$$

$$= \left(\frac{rE}{R_1+2r}\right)(X) \tag{22}$$

$$and \quad e_{i_2} = Vi_2 X \tag{23}$$

$$= \left(\frac{rE}{R_2+2r}\right)(X) \tag{24}$$

$$and \quad e_{i_3} = Vi_3 X \tag{25}$$

$$= \left(\frac{rE}{R_3+2r}\right)(X) \tag{26}$$

Analogously, the r.m.s. noise $e_R$ generated in the thin films 21, 31, and 41 will be given by $$e_{R_1} = V_{R_1}(Y) \tag{27}$$

$$= \left(\frac{R_1 E}{R_1+2r}\right)(Y) \tag{28}$$

$$e_{R_2} = V_{R_2} \sqrt{\frac{R_1}{R_2}}(Y) \tag{29}$$

$$= \left(\frac{R_2 E}{R_2+2r}\right) \sqrt{\frac{R_1}{R_2}}(Y) \tag{30}$$

and $$e_{R_3} = V_{R_3} \sqrt{\frac{R_1}{R_3}}(Y) \tag{31}$$

$$= \frac{R_3 E}{R_3+2r} \sqrt{\frac{R_1}{R_3}}(Y) \tag{32}$$

Now the total r.m.s. noise N for a plurality of series resistors, each contributing a noise component, $e$, is given by $$N^2 = e_1^2 + e_2^2 + e_3^2 \ldots e_n^2 \tag{33}$$

Accordingly, the total noise of the resistor 20, including the thin-film proper 21 and the two, thin film-contact pad interfaces is given by $$N_1^2 = e^2_{i_1} + e^2_{i_1} + e^2_{R_1} \tag{34}$$

$$= 2e^2_{i_1} + e^2_{R_1} \tag{35}$$

Similarly, for resistors 30 and 40

$$N_2^2 = 2e^2_{i_2} + e^2_{R_2} \tag{36}$$

$$and \quad N_3^2 = 2e^2_{i_3} + e^2_{R_3} \tag{37}$$

Substituting equations 22 and 28 in equation 35

$$N_1^2 = 2\left(\frac{XrE}{R_1+2r}\right)^2 + \left(\frac{YR_1E}{R_1+2r}\right)^2 \tag{38}$$

$$(N_1^2/E^2)(R_1+2r)^2 = 2X^2r^2 + Y^2R_1^2 \tag{39}$$

Similarly, $$(N_2^2/E^2)(R_2+2r)^2 = 2X^2r^2 + Y^2R_1R_2 \tag{40}$$

$$(N_3^2/E^2)(R_3+2r)^2 = 2X^2r^2 + Y^2R_1R_3 \tag{41}$$

Now, E is known, and $N_1$, $N_2$, and $N_3$ can be measured with a noise-measuring test set. Further $R_1$, $R_2$, and $R_3$ can be measured with an ohmmeter connected between the contact pads. Such a resistance measurement will include the resistance of the two interfaces ($2r$) but the magnitude of the interface resistance is so small with respect to R1, R2, or R3, that, for practical purposes, it can be ignored during direct measurement of R1, R2, or R3. Thus, $r$ may be solved for in terms of $N_1$ and $R_1$, etc. by eliminating X and Y. Eliminating $X^2$ from equations 40 and 41 yields:

$$Y^2 R_1 E^2 = \frac{1}{R_2 - R_3} [(R_2 + 2r)^2 N_2^2 - (R_3 + 2r)^2 N_3^2] \quad (42)$$

From equations 39 and 41 we obtain:

$$Y^2 R_1 E^2 = \frac{1}{R_1 - R_3} [(R_1 + 2r)^2 N_1^2 - (R_3 + 2r)^2 N_3^2] \quad (43)$$

Eliminating $Y^2$ from equations 42 and 43 yields:

$$(R_2 - R_3) ] (R_1 + 2r)^2 N_1^2 - (R_3 + 2r)^2 N_3^2] = (R_1 - R_3) [ (R_2 + 2r)^2 N_2^2 - (R_3 - 2r)^2 N_3^2] \quad (44)$$

By collecting and rearranging terms, equation 44 can be written as:

$$r^2 \{ 4[N_1^2(R_2 - R_3) + N_2^2(R_3 - R_1) + N_3^2(R_1 - R_2)] \}$$
$$+ r \{ 4[R_1 N_1^2(R_2 - R_3) + R_2 N_2^2(R_3 - R_1) + R_3 N_3^2(R_1 - R_2)] \} + [R_1^2 N_1^2(R_2 - R_3) + R_2^2 N_2^2(R_3 - R_1) + R_3^2 N_3^2(R_1 - R_2)] = 0. \quad (45)$$

This equation can be written more simply by defining $$\alpha_1 = N_1^2(R_2 - R_3) \quad (46)$$

$$\alpha_2 = N_2^2(R_3 - R_1) \quad (47)$$

$$\alpha_3 = N_3^2(R_1 - R_2) \quad (48)$$

The equation for $r$ becomes $$\sum_{i=1}^{3} (4r^2 \alpha_i + 4r R_i \alpha_i + R_i^2 \alpha_i) = 0 \quad (49)$$

This equation can be solved by standard algebraic techniques to give $$r = 1/2 \left( \frac{1}{\alpha_1 + \alpha_2 + \alpha_3} \right) [R_1 \alpha_1 - R_2 \alpha_2 - R_3 \alpha_3$$
$$\pm \sqrt{(R_1 \alpha_1 + R_2 \alpha_2 + R_3 \alpha_3)^2 - (\alpha_1 + \alpha_2 + \alpha_3)(R_1^2 \alpha_1 + R_2^2 \alpha_2 + R_3^2 \alpha_3)}] \quad (50)$$

It can be shown (for example, by letting $Y \rightarrow 0$) that, in general, the coefficients of $r^2$ and $r$ in equation 45 have the same sign while the constant term has a sign opposite to that of the first two coefficients. Thus, the plus sign is required in front of the radical in equation 50 to arrive at a physically meaningful value for $r$.

Now that $r$ has been determined, only two dependent variables remain, and any two of the equations 39, 40, and 41 can be used to solve for $X^2$ and $Y^2$. Accordingly, 39 and 40 for $R_1$ and $R_2$ will be used. The result is $$Y^2 = \frac{1}{E^2 R_1 (R_2 - R_1)} [(R_2 + 2r)^2 N_2^2 - (R_1 + 2r)^2 N_1^2]$$

$$X^2 = (1/2r^2) [(N_1^2/E^2)(R_1 + 2r)^2 - Y^2 R_1^2]. \quad (52)$$

FIG. 4 depicts one illustrative apparatus which may be used, according to this invention, to automatically deter-mine the noise and resistance contribution of the thin film and thin film-contact pad interfaces of resistors 20, 30, and 40.

One contact of each of the resistors 20, 30, and 40 is connected to ground. The other contact of each of the resistors 20, 30, and 40 is connected through a switching matrix 61 to either a digital resistance measuring circuit 62, or by a lead 63 to a source of test potential 64 and a noise measuring circuit 65. The analog voltage output of the noise measuring circuit 65 is connected to an analog-to-digital converter 66. The digital outputs from the digital resistance measuring circuit 62, and from the analog-to-digital converter 66, are connected to input circuits of a digital computer 70. Output circuits of the digital computer 70 are connected to a control circuit 71 which controls the switching matrix 61.

The switching matrix 61 may comprise any number of well-known switching devices, but advantageously is a group of six relays, such as relay 72, having a coil 73 which operates a single, normally open contact 74, with the contacts, such as contact 74, connected in a 2 × 3 matrix. The relay contacts 74 are preferably gold or silver plated to provide a low-noise and low-resistance path when a contact is closed, to thereby minimize additional resistance and noise during the performance of the resistance and noise measurements on the resistors 20, 30, and 40. The control circuit 71 advantageously comprises a bistable circuit and a driver amplifier for each relay, so that each relay can be operated and released by pulses from the digital computer 70. Such a control circuit is well known in the art.

The resistance measuring circuit 62, the noise measuring circuit 65, the analog-to-digital converter 66, and the digital computer 70 can be commercially available units. For example, the digital resistance measuring circuit 62 can be a Fluke Model 8300A Digital Voltmeter with Ohmmeter Accessory, the noise measuring circuit 63 can be a Quan-Tech Model 315 Resistor-Noise Test Set, the analog-to-digital converter can be a Digital Equipment Corporation Model ADO8-A, and the digital computer can be a Digital Equipment Corporation PDP8I. The interconnection details of apparatus, such as is shown in FIG. 4, are discussed in the Digital Equipment Corporation Small Computer Handbook 1970 Edition, beginning on page 229. The Small Computer Handbook also describes the operation of the PDP8I computer, beginning on page 1.

If a Quan-Tech Resistor-Noise Test Set is used for the noise measuring circuit 65, the separate potential source 64 is not necessary, as this test set includes a potential source equivalent to the potential source 64. The separate potential source 64 is shown in FIG. 4, however, the facilitate explanation.

In operation, digital computer 70 controls the switching matrix 61 to connect resistors 20, 30, and 40, in turn, to the digital resistance measuring circuit 62, so that the resistance of resistors 20, 30, and 40 can be measured. After a resistor has been measured, the resulting digital resistance value is tranferred into the digital computer 70, and is stored in the computer memory for use in subsequent calculations. The digital computer 70 then controls the switching matrix 61 to connect resistors 20, 30, and 40, in turn, to the potential source 64 and the noise measuring circuit 65 so that the noise voltage generated by each resistor can be measured. The voltage, E, supplied by the potential source 64, causes a current to flow through the resistor being tested. The noise voltage thereupon generated by the resistor is measured by the noise measuring circuit 65, which transmits an analog voltage signal, representative of the magnitude of the measured noise voltage, to the analog-to-digital converter 66. The analog-to-digital converter 66 converts the analog voltage signal representative of the measured noise into digital form suitable for transfer into the digital computer 70. After a noise measurement has been made, the resulting digital noise value is stored in the computer memory for use in subsequent calculations.

In order to clarify the actions of the digital computer 70 in performing the methods of the invention with the apparatus shown in FIG. 4, a sequence of computer program steps will be described. The steps set forth a series of operations of the digital computer which can be performed to determine the desired noise factors X and Y for a set of three resistors on a substrate under test. The steps can easily be encoded into computer instructions for the PDP8I computer, or any similar computer, by one skilled in the programming art.

The computer program steps are as follows:

Step 1: Control matrix switch 61 to connect resistor 20 to digital resistance measuring circuit 62; input and store digital resistance measurement, $R_1$, for resistor 20.

Step 2: Control matrix switch 61 to connect resistor 30 to digital resistance measuring circuit 62; input and store digital resistance measurement, $R_2$, for resistor 30.

Step 3: Control matrix switch 61 to connect resistor 40 to digital resistance measuring circuit 62; input and store digital resistance measurement, $R_3$, for resistor 40.

Step 4: Control matrix switch 61 to connect resistor 20 to potential source 64 and noise measuring circuit 65; input and store digital noise measurement $N_1$ for resistor 20.

Step 5: Control matrix switch 61 to connect resistor 30 to potential source 63 and noise measuring circuit 65; input and store digital noise measurement $N_2$ for resistor 30.

Step 6: Control matrix switch 61 to connect resistor 40 to potential source 64 and noise measuring circuit 65; input and store digital noise measurement $N_3$ for resistor 40.

Step 7: Calculate the value of r by evaluating the expression:

$$r = 1/2 \left(\frac{1}{\alpha_1+\alpha_2+\alpha_3}\right) [R_1\alpha_1 - R_2\alpha_2 - R_3\alpha_3 \pm \sqrt{(R_1\alpha_1+R_2\alpha_2+R_3\alpha_3)^2 - (\alpha_1+\alpha_2+\alpha_3)(R_1^2\alpha_1+R_2^2\alpha_2+R_3^2\alpha_3)}]$$

where
$\alpha_1 = N_1^2(R_2 - R_3)$
$\alpha_2 = N_2^2(R_3 - R_1)$
$\alpha_3 = N_3^2(R_1 - R_2)$ Step 8: Calculate the value of X by evaluating the expression:

$$X = \sqrt{(1/2r^2)[(N_1^2/E^2)(R_1+2r)^2 - Y^2R_1^2]}$$

The value of E has previously been stored in the computer memory.

Step 9: Calculate the value of Y by evaluating the expression:

$$Y = \sqrt{\frac{1}{E^2R_1(R_2-R_1)}[(R_2+2r)^2N_2^2 - (R_1+2r)^2N_1^2]}$$

Step 10: Output of the values of r, X and Y.

The values of r, X and Y calculated by the digital computer 70 can be transmitted to any suitable output device (not shown), such as a printer or a visual display.

It should be appreciated that the term "thin film," as used in the specification and claims, is not used in any limiting sense. I specifically do not intend to limit the scope of the invention to films which have been deposited onto a substrate by cathodic sputtering or by evaporation, which, to some in the art, are called "thin films" regardless of their actual physical dimensions. Thus, the invention has application to the so-called "thick films," i.e., films that have been deposited mechanically, or otherwise, onto a substrate, e.g., ceramic, and then fired into the substrate by a heat process, or the like. Such "thick films" may in some instances be thinner than the so-called "thin films." In any event, the term "thin film," as used in the specification and claims, is intended to cover all such films regardless of relative thickness and/or the manner of deposition and generally means a metal or metallic film which is at least smaller in thickness than the underlying substrate which supports it.

Further, the term "deposit," as used in the specification and claims, with reference to the creation of the interface between the thin-film proper and the conductive contact pads, is not used in a limiting sense but encompasses sputtering, evaporation, silk-screening, etc.

One skilled in the art can make various changes and modifications to the methods and apparatus disclosed herein without departing from the spirit and scope of this invention.

What is claimed is:

1. A method of determining electrical noise figures for the thin-film portions and the thin film-contact pad interfaces of thin-film devices fabricated on an insulating substrate, comprising the steps of:

fabricating three thin-film resistors, having different resistances, in proximate relation on the substrate;

depositing a pair of conductive contact pads on each of said resistors, the areas of the interfaces between said contact pads and said resistors being equal for all of said resistors;

by automatic measuring means, determining the resistance between the contact pads of each of said resistors, and storing the values of the resistances;

by automatic measuring means, determining the noise voltage generated by each of said resistors during the application of a test potential between the contact pads thereof, and storing the values of the noise voltages; and by machine means, solving the equations:

$$2E^2r^2X^2 + E^2R_1^2Y^2 - 4N_1^2r^2 - 4rR_1N_1^2 = N_1^2R_1^2$$

$$2E^2r^2X^2 + E^2R_1R_2Y^2 - 4N_2^2r^2 - 4rR_2N_2^2 = N_2^2R_2^2$$

$$2E^2r^2X^2 + E^2R_1R_3Y^2 - 4N_3^2r^2 - 4rR_3N_3^2 = N_3^2R_3^2$$

for unknowns r, X, and Y, where:

$R_1$, $R_2$, and $R_3$ are the resistance values measured in said resistance determining step;

$N_1$, $N_2$, and $N_3$ are the noise voltage values measured in said noise determining step;

E is the magnitude of the test potential which has been previously stored in the computer;

r is the resistance of each of the thin film-contact pad interfaces;

X is the noise figure for the thin film-contact pad interfaces; and

Y is the noise figure for the thin-film portions of the resistors.

2. A method of operating a digital computer to determine electrical noise figures for the thin-film portions and thin film-contact pad interfaces of thin-film devices fabricated on a substrate, wherein three thin-film resistors, having different resistance values, are fabricated on said substrate, and a pair of conductive contact pads is deposited on each of said resistors, with the areas of the interfaces between said contact pads and said resistors being equal for all of said resistors, which comprises:

under the control of said computer, initiating a measurement of the resistance between the contact pads of each of said resistors, and storing the resulting resistance values, $R_1$, $R_2$, and $R_3$, in the computer;

under the control of said computer, initiating a measurement of the noise voltages generated by each of said resistors during the application of a test potential E between the contact pads thereof, and storing the values of the noise voltages $N_1$, $N_2$, and $N_3$, corresponding to $R_1$, $R_2$, and $R_3$, respectively; and solving, in said computer, the equations:

$$2E^2r^2X^2 + E^2R_1^2Y^2 - 4N_1^2r^2 - 4rR_1N_1^2 = N_1^2R_1^2$$

$$2E^2r^2X^2 + E^2R_1R_2Y^2 - 4N_2^2r^2 - 4rR_2N_2^2 = N_2^2R_2^2$$

$$2E^2r^2X^2 + E^2R_1R_3Y^2 - 4N_3^2r^2 - 4rR_3N_3^2 = N_3^2R_3^2$$

for unknowns r, X, and Y, the value of E being previously stored in the computer, and
where:
r is the resistance of each of the contact pad-thin film interfaces;
X is the noise figure for the contact pad-thin film interfaces; and
Y is the noise figure for the thin-film portions of the resistors.

3. Apparatus for allocating the electrical noise generated by thin-film devices, fabricated on a substrate, between the thin-film portion and the thin film-contact pad interfaces, comprising:

three thin-film resistors fabricated on said substrate, having different resistances $R_1$, $R_2$, and $R_3$, and having a pair of conductive contact pads fabricated thereon, the area of thin-film material underlying each of the contact pads being the same for each of said resistors;
a digital computer;
means, under the control of said digital computer, for measuring the resistance of said resistors and for transmitting said resistance values to the computer for storage therein;
a source of test potential;
means, under the control of said digital computer, for measuring the noise voltages generated by each of said resistors during the application of said test potential, and for transmitting the values of said noise voltages to the computer for storage therein;
said computer performing calculations using said stored resistance values and noise values to determine the desired noise allocation.

4. A process for using a digital computer to determine the electrical noise generated across both the thin-film portions and the thin film-contact pad interfaces of thin-film devices fabricated on a substrate, comprising the steps of:

generating first digital signals representative of the resistances of three thin-film resistors fabricated on said substrate, each of said resistors possessing a different resistance, and having two conductive contact pads affixed thereto, the areas of the thin-film material underlying each of said contact pads being the same for each of said resistors;

generating second digital signals representative of the noise voltages generated across each of said resistors during the application of a test potential thereacross; and by machine means, operating on said first and second digital signals, and a digital signal representative of said test potential, to derive digital signals representative of the noise contributions of the thin-film portions and the thin film-contact pad interfaces of said devices.

5. A method of using a digital computer to allocate the electrical noise generated by thin-film devices fabricated on a substrate between the thin-film portions and the interfaces between the thin film and conductive contact pads overlaid on the film, comprising the steps of:

fabricating three electrically and physically similar thin-film resistors on adjacent regions on said substrate, each of said resistors having two conductive contact pads overlaid thereon, the total thin-film area contacted by each of the pads being substantially equal for each one of said at least three resistors;

under the control of said computer, measuring the electrical resistances $R_1$, $R_2$, and $R_3$ of each of said resistors, and storing the values of said resistances in the computer;

under the control of said computer, measuring the electrical noise voltages $N_1$, $N_2$, and $N_3$ generated by each of said resistors during the application thereacross of a test potential E, and storing the values of said noise voltages in the computer;

in said computer, calculating the resistance r of the contact pad-thin film interfaces according to the formula:

$$r = 1/2 \left(\frac{1}{\alpha_1+\alpha_2+\alpha_3}\right) [R_1\alpha_1 - R_2\alpha_2 - R_3\alpha_3 \pm \sqrt{(R_1\alpha_1+R_2\alpha_2+R_3\alpha_3)^2 - (\alpha_1+\alpha_2+\alpha_3)(R_1^2\alpha_1+R_2^2\alpha_2+R_3^2\alpha_3)}]$$

where $$\alpha_1 = N_1^2(R_2 - R_3)$$

$$\alpha_2 = N_2^2(R_3 - R_1)$$

$$\alpha_3 = N_3^2(R_1 - R_2)$$

in said computer, calculating the noise Y allocable to the thin-film portions of said devices according to the formula:

$$Y = \sqrt{\frac{1}{E^2R_1(R_2-R_1)}[(R_2+2r)^2N_2^2 - (R_1+2r)^2N_1^2]}$$

and;

in said computer, calculating the noise X allocable to the contact pad-thin film interfaces on said devices according to the formula:

$$X = \sqrt{(1/2r^2)[(N_1^2/E^2)(R_4+2r)^2 - Y^2R_1^2]}$$

where the value of E has previously been stored in said computer.

6. A method of determining the noise generated across both the thin-film portion and the thin film-contact pad interfaces of a thin-film device, to aid in determining which of the plurality of processing steps utilized in the manufacture of the device is responsible for excessive noise observed therein, comprising the steps of:

fabricating three thin-film resistors in proximate relation on an insulating substrate utilizing the same processes which were used to manufacture the device observed to have excessive noise;

depositing a pair of conductive contact pads on each of said three resistors, the areas of the interfaces between said contact pads and said thin-film portions being the same for all of said devices;

measuring, under the control of a digital computer, the electrical resistances of each of said resistors and storing the resulting resistance values $R_1$, $R_2$, and $R_3$ in the digital computer;

measuring, under the control of the digital computer, the noise voltages generated by each of said resistors during the application of a test potential E across the contact pads thereof, and storing the values of the noise voltages corresponding to $R_1$, $R_2$, and $R_3$ as $N_1$, $N_2$, and $N_3$, respectively; and solving, in said computer, the equations:

$$2E^2r^2X^2 + E^2\text{i } R_1^2Y_2 - 4N_1^2r^2 - 4rR_1N_1^2 = N_1^2R_1^2$$

$$2E^2r^2X^2 + E^2R_1R_2Y^2 - 4N_2^2r^2 - 4rR_2N_2^2 = N_2^2R_2^2$$

$$2E^2r^2X^2 + E^2R_1R_3Y^2 - 4N_3^2r^2 - 4rR_3N_3^2 = N_3^2R_3^2$$

for unknowns $r$, X, and Y, the value of E being previously stored in the computer, where:

$r$ is the resistance of each of the contact pad-thin film interfaces of the resistors;

X is the noise figure for the contact pad-thin film interfaces of the resistors;

Y is the noise figure for the thin-film portions of the resistors, whereby comparisons with desired values of X and Y can be made to determine whether the excessive noise is being caused by the thin-film fabrication steps or by the contact pad fabrication steps.

7. A method of operating a digital computer to determine the noise generated across both the thin-film portion and the thin film-contact pad interfaces of a thin-film device, to determine which of a plurality of fabricating steps utilized in the manufacture of the device is responsible for excessive noise observed therein, using a thin-film circuit comprising three thin-film resistors fabricated in proximate relation on an insulating substrate by the same processes which were used to manufacture the device observed to have excessive noise, each of said resistors having a pair of conductive contact pads deposited thereon, the area of the interface between the contact pads and said thin film being the same for all three of said resistors, comprising the steps of:

under the control of said computer, measuring the electrical resistance of each of said resistors and storing the resulting resistance values, $R_1$, $R_2$, and $R_3$, in the digital computer;

under the control of said computer, measuring the noise voltages generated by each of said resistors during the application of a test potential E across the contact pads thereof, and storing the values of the noise voltages corresponding to $R_1$, $R_2$, and $R_3$ as $N_1$, $N_2$, and $N_3$, respectively; and solving, in said computer, the equations:

$$2E^2r^2X^2 + E^2R_1^2Y^2 - 4N_1^2\text{i } r^2 - 4rR_1N_1^2 = N_1^2R_1^2$$

$$2E^2r^2X^2 + E^2R_1R_2Y^2 - 4N_2^2r^2 - 4rR_2N_2^2 = N_2^2R_2^2$$

$$2E^2r^2X^2 + E^2R_1R_3Y^2 - 4N_3^2r^2 - 4rR_3N_3^2 = N_3^2R_3^2$$

for unknowns $r$, X, and Y, the value of E being previously stored in the computer, where:

$r$ is the resistance of each of the contact pad-thin film interfaces of the resistors;

X is the noise figure for the contact pad-thin film interfaces of the resistors;

Y is the noise figure for the thin-film portions of the resistors, whereby comparisons with desired values of X and Y can be made to determine whether the excessive noise is being caused by the thin-film fabrication steps or the contact pad fabrication steps.

8. A process for determining, by the use of a digital computer to analyze the noise generated across both the thin-film portion and the thin film-contact pad interfaces of a thin-film device, which of a plurality of processing steps utilized in the manufacture of the thin-film device is primarily responsible for an unacceptably high noise level in the device, comprising the steps of:

generating, under the control of said digital computer, first digital signals representative of the resistances of three thin-film resistors fabricated on said substrate, each of said resistors possessing a different resistance, and having two conductive contact pads affixed thereto, the areas of the thin-film material underlying each of said contact pads being the same for each of said resistors;

generating, under the control of said digital computer, second digital signals representative of the noise voltages generated across each of said resistors during the application of a test potential thereacross; and in said digital computer, operating on said first and second digital signals, and a digital signal representative of said test potential, to derive digital signals representative of the noise contributions of the thin-film portions and the thin film-contact pad interfaces of said devices, whereby comparisons with digital signals representing optimum noise contributions can be made to determine whether the excessive noise is being caused by the thin-film processing steps or the contact pad processing steps.

9. A method for determining the noise contributions in a thin-film resistor, and its interfaces with external circuitry, comprising the steps of:

fabricating three thin-film resistors having different resistances in proximate relation on an insulating substrate;

attaching conductive means to said resistors which provide identical interface areas between said conductive means and each of said resistors;

under the control of machine means, measuring the resistance of each of said resistors and storing in said machine means the resistance values $R_1$, $R_2$, and $R_3$;

under the control of machine means, measuring the noise voltages generated by each of said resistors during the application of a test potential, E, thereacross, and storing in said machine means the values of the noise voltages corresponding to $R_1$, $R_2$, and $R_3$ as $N_1$, $N_2$, and $N_3$, respectively; and by machine means, solving, the equations:

$$2E^2r^2X^2 + E^2R_1^2Y^2 - 4N_1^2r^2 - 4rR_1N_1^2 = N_1^2R_1^2$$

$$2E^2r^2X^2 + E^2R_1R_2Y^2 - 4N_2^2r^2 - 4rR_2N_2^2 = N_2^2R_2^2$$

$$2E^2r^2X^2 + E^2R_1R_3Y^2 - 4N_3^2r^2 - 4rR_3N_3^2 = N_3^2R_3^2$$

for unknowns $r$, X, and Y, the value of E being previously stored in said machine means, where $r$ represents the resistance of each of the contact pad-thin film interfaces, and X and Y represent, respectively, the noise figure of said interface areas and that of said resistors external to said interface areas.

* * * * *

UNITED STATES PATENT OFFICE
CERTIFICATE OF CORRECTION

Patent No. 3,692,987     Dated September 19, 1972

Inventor(s) Laurence William Bos

It is certified that error appears in the above-identified patent and that said Letters Patent are hereby corrected as shown below:

In the specification, Column 1, line 39, "in oxide" should read --in the oxide--; lines 56-58, "sputtering process used for the deposition of terminals on the resistors, or the gold evaporation process that is defective," should read --sputtering process, used for the fabrication of the resistors, or the gold evaporation process, used for the deposition of terminals on the resistors that is defective,--. Column 5, equation 8, "E = TR" should read --E = $IR_{total}$--. Column 6, equation 32

"$= \frac{R_3 E}{R_3+2r} \sqrt{\frac{R_1}{R_3}}$ (Y)" should read -- $= \frac{R_3 E}{(R_3+2r)} \sqrt{\frac{R_1}{R_3}}$ (Y) --

Column 7, equation 42

"$Y^2 R_1 E^2 = \frac{1}{R_2-R_3} [(R_2+2r)^2 N_2^2 - (R_3+2r)^2 N_3^2]$" should read -- $Y^2 R_1 E^2 = \frac{1}{(R_2-R_3)} [(R_2+2r)^2 N_2^2 - (R_3+2r)^2 N_3^2]$ --

Column 7, equation 43

"$Y^2 R_1 E^2 = \frac{1}{R_1-R_3} [(R_1+2r)^2 N_1^2 - (R_3+2r)^2 N_3^2]$" should read -- $Y^2 R_1 E^2 = \frac{1}{(R_1-R_3)} [(R_1+2r)^2 N_1^2 - (R_3+2r)^2 N_3^2]$ --

UNITED STATES PATENT OFFICE
CERTIFICATE OF CORRECTION

Patent No. 3,692,987     Dated September 19, 1972

Inventor(s) Laurence William Bos

It is certified that error appears in the above-identified patent and that said Letters Patent are hereby corrected as shown below:

Column 7, equation 44,

"$(R_2-R_3)\,](R_1+2r)^2 N_1^2 - (R_3+2r)^2 N_3^2] = (R_1-R_3)\,[$ $(R_2+2r)^2 N_2^2 - (R_3-2r)^2 N_3^2]$ " should read --$(R_2-R_3)\,[(R_1+2r)^2 N_1^2 - (R_3+2r)^2 N_3^2] = (R_1-R_3)$ $[(R_2+2r)^2 N_2^2 - (R_3-2r)^2 N_3^2]$--

Column 7, last line of equation 45

" $+R_2^2 N_2^2 (R_3-R_1) + R_3^2 (R_1-R_2)] = 0$ " should read

-- $+R_2^2 N_2^2 (R_3-R_1) + R_3^2 N_3^2 (R_1-R_2)] = 0$ --

Column 7, first line of equation 50

"$r = 1/2 \left(\dfrac{1}{\alpha_1+\alpha_2+\alpha_3}\right) [R_1\alpha_1 - R_2\alpha_2 - R_3\alpha_3$ " should read --$r = 1/2 \left(\dfrac{1}{\alpha_1+\alpha_2+\alpha_3}\right) [- R_1\alpha_1 - R_2\alpha_2 - R_3\alpha_3$ --

UNITED STATES PATENT OFFICE
CERTIFICATE OF CORRECTION

Patent No. 3,692,987  Dated September 19, 1972

Inventor(s) Laurence William Bos

It is certified that error appears in the above-identified patent and that said Letters Patent are hereby corrected as shown below:

Column 7, line 51, insert equation number --(51)--. Column 8, line 47 "the" should read --to--. Column 9, line 33, "63" should read --64--; line 42

"$r = 1/2 \left( \frac{1}{\alpha_1 + \alpha_2 + \alpha_3} \right) [R_1\alpha_1 - R_2\alpha_2 - R_3\alpha_3$" should read --$r = 1/2 \left( \frac{1}{\alpha_1 + \alpha_2 + \alpha_3} \right) [- R_1\alpha_1 - R_2\alpha_2 - R_3\alpha_3$--

Column 9, line 62, "Step 10: Output of the" should read --Step 10: Output the--. Column 12, claim 5, line 52

"$r = 1/2 \left( \frac{1}{\alpha_1 + \alpha_2 + \alpha_3} \right) [R_1\alpha_1 - R_2\alpha_2 - R_3\alpha_3$" should read --$r = 1/2 \left( \frac{1}{\alpha_1 + \alpha_2 + \alpha_3} \right) [- R_1\alpha_1 - R_2\alpha_2 - R_3\alpha_3$--

In the claims,
Column 13, claim 6, line 37

"$2E^2 r^2 X^2 + E^2 i R_1^2 Y_2 - 4N_1^2 r^2 - 4rR_1 N_1^2 = N_1^2 R_1^2$" should read --$2E^2 r^2 X^2 + E^2 R_1^2 Y^2 - 4N_1^2 r^2 - 4rR_1 N_1^2 = N_1^2 R_1^2$--

Column 14, claim 7, line 17

"$2E^2 r^2 X^2 + E^2 R_1^2 Y^2 - 4N_1^2 i r^2 - 4rR_1 N_1^2 = N_1^2 R_1^2$" should read --$2E^2 r^2 X^2 + E^2 R_1^2 Y^2 - 4N_1^2 r^2 - 4rR_1 N_1^2 = N_1^2 R_1^2$--.

Signed and sealed this 10th day of April 1973.

(SEAL)
Attest:

EDWARD M. FLETCHER, JR.
Attesting Officer

ROBERT GOTTSCHALK
Commissioner of Patents